United States Patent
Lortz et al.

(10) Patent No.: US 9,602,471 B2
(45) Date of Patent: Mar. 21, 2017

(54) DEVICE INTRODUCTION AND ACCESS CONTROL FRAMEWORK

(75) Inventors: Victor B. Lortz, Beaverton, OR (US); Jesse R. Walker, Portland, OR (US); Shriharsha S. Hegde, Beaverton, OR (US); Amol A. Kulkarni, Hillsboro, OR (US); Tsung-Yuan C. Tai, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 13/430,320

(22) Filed: Mar. 26, 2012

(65) Prior Publication Data
US 2012/0185696 A1 Jul. 19, 2012

Related U.S. Application Data

(62) Division of application No. 10/933,696, filed on Sep. 3, 2004, now Pat. No. 8,146,142.

(51) Int. Cl.
*H04L 29/06* (2006.01)
*G06F 21/43* (2013.01)
*H04W 12/04* (2009.01)

(52) U.S. Cl.
CPC .............. *H04L 63/04* (2013.01); *G06F 21/43* (2013.01); *H04L 63/08* (2013.01); *H04L 63/105* (2013.01); *H04L 63/18* (2013.01); *G06F 2221/2129* (2013.01); *H04W 12/04* (2013.01)

(58) Field of Classification Search
None
See application file for complete search history.

(56) References Cited

U.S. PATENT DOCUMENTS

| 5,311,596 A | 5/1994 | Scott et al. |
| 5,887,063 A | 3/1999 | Varadharajan et al. |
| 6,678,827 B1 | 1/2004 | Rothermel et al. |
| 6,850,252 B1* | 2/2005 | Hoffberg ............ 715/716 |
| 7,275,156 B2* | 9/2007 | Balfanz et al. ........... 713/168 |
| 7,418,596 B1 | 8/2008 | Carroll et al. |
| 8,146,142 B2 | 3/2012 | Lortz et al. |
| 2002/0062451 A1 | 5/2002 | Scheidt et al. |

(Continued)

FOREIGN PATENT DOCUMENTS

| WO | WO-0199369 A2 | 12/2001 |
| WO | WO-2006028651 A2 | 3/2006 |
| WO | WO-2006028651 A3 | 3/2006 |

OTHER PUBLICATIONS

Se Hyun Park, Aura Ganz, and Zvi Ganz. 1998. Security protocol for IEEE 802.11 wireless local area network. Mob. Netw. Appl. 3, 3 (Sep. 1998), 237-246. DOI=10.1023/A:1019180916909 http://dx.doi.org/10.1023/A:1019180916909.*

(Continued)

*Primary Examiner* — Jeffery Williams
(74) *Attorney, Agent, or Firm* — Schwegman Lundberg & Woessner, P.A.

(57) ABSTRACT

In an embodiment, a method includes registering applications and network services for notification of an out-of-band introduction, and using the out-of-band introduction to bootstrap secure in-band provisioning of credentials and policies that are used to control subsequent access and resource sharing on an in-band channel. In another embodiment, an apparatus implements the method.

6 Claims, 9 Drawing Sheets

(56) References Cited

U.S. PATENT DOCUMENTS

| | | | |
|---|---|---|---|
| 2003/0055898 A1 | 3/2003 | Yeager et al. | |
| 2003/0149874 A1 | 8/2003 | Balfanz et al. | |
| 2003/0169713 A1 | 9/2003 | Luo | |
| 2003/0200433 A1 | 10/2003 | Stirbu | |
| 2004/0030932 A1 | 2/2004 | Juels et al. | |
| 2004/0098581 A1* | 5/2004 | Balfanz et al. | 713/155 |
| 2004/0107366 A1* | 6/2004 | Balfanz et al. | 713/201 |
| 2004/0268119 A1 | 12/2004 | Smetters et al. | |
| 2005/0097362 A1 | 5/2005 | Winget et al. | |
| 2005/0108546 A1 | 5/2005 | Lehew et al. | |
| 2005/0114900 A1* | 5/2005 | Ladd et al. | 725/100 |
| 2005/0120213 A1 | 6/2005 | Winget et al. | |
| 2005/0120215 A1 | 6/2005 | Lehew et al. | |
| 2005/0223230 A1 | 10/2005 | Zick | |
| 2006/0041755 A1 | 2/2006 | Pemmaraju | |
| 2006/0053276 A1 | 3/2006 | Lortz et al. | |
| 2007/0053513 A1* | 3/2007 | Hoffberg | 380/201 |
| 2008/0072292 A1 | 3/2008 | Narjala | |
| 2008/0091618 A1 | 4/2008 | Obrea et al. | |
| 2008/0178252 A1 | 7/2008 | Michaud | |

OTHER PUBLICATIONS

"U.S. Appl. No. 10/933,696 , Response filed Aug. 15, 2011 to Non Final Office Action mailed May 13, 2011", 10 pgs.

"U.S. Appl. No. 10/933,696, Final Office Action mailed Jun. 18, 2009", 16 pgs.

"U.S. Appl. No. 10/933,696, Final Office Action mailed Oct. 18, 2010".

"U.S. Appl. No. 10/933,696, Non Final Office Action mailed May 13, 2011", 12 pgs.

"U.S. Appl. No. 10/933,696, Non-Final Office Action mailed Feb. 19, 2010", 13 pgs.

"U.S. Appl. No. 10/933,696, Non-Final Office Action mailed Jun. 27, 2008", 7 pgs.

"U.S. Appl. No. 10/933,696, Non-Final Office Action mailed Nov. 25, 2008", 21 pgs.

"U.S. Appl. No. 10/933,696, Notice of Allowance mailed Nov. 17, 2011", 9 pgs.

"U.S. Appl. No. 10/933,696, Response filed Feb. 24, 2009 to Non-Final Office Action mailed Nov. 25, 2008", 11 pgs.

"U.S. Appl. No. 10/933,696, Response filed Jul. 23, 2008 to Restriction Requirement mailed Jun. 27, 2008", 1 pg.

"U.S. Appl. No. 10/933,696, Response filed Dec. 18, 2009 to Final Office Action mailed Jun. 18, 2009", 8 pgs.

"U.S. Appl. No. 10/933,696, Restriction Requirement mailed Jun. 27, 2008", 7 pgs.

"Device Security and Security Console V 1.0", http://web.archive.org/web/20040214132309/http://www.upnp.org/standardizeddcps/security.asp, (archived Feb. 14, 2004), 1 pg.

"International Application Serial No. PCT/US2005/028698, International Preliminary Report on Patentability mailed Nov. 21, 2011", 34 pgs.

"Malaysian Application Serial No. PI20054144, Search Report mailed Feb. 8, 2012", 1 pgs.

"Malaysian Application Serial No. PI20054144, Substantive Adverse Examination Report mailed Feb. 8, 2012", 2 pgs.

"Slides and architecture document from WinHEC 2004", WINHEC.

"Windows Connect Now—NET Specification", ((Updated Dec. 12, 2006)), 1 pg.

"Windows Connect Now Technology (updated Dec. 21, 2004)", http://www.microsoft.com/windowsxp/using/networking/getstarted/windowsconnectnow.msp x, (Dec. 21, 2004).

Balfanz, D., et al., "Network-in-a-Box: How to Set Up a Secure Wireless Network in Under a Minute", Palo Alto Research Center, (May 26, 2004), 17 pgs.

Balfanz, D., et al., "Talking to Strangers: Authentication in Ad-Hoc Wireless Networks", Conference Proceedings, Network and Distributed System Security Symposium (NDSS '02), (2002), 13 pages.

Bowman, Barb, "Set up a secure wireless network using Windows Connect Now", http://www.microsoft.com/windowsxp/using/networking/learnmore/bowman_05june13.mspx, (Jun. 13, 2005).

Chown, P., "Advanced Encyption Standard (AES) Ciphersuites for Transport Layer Security (TLS)", RFC 3628, Network Working Group, (Jun. 2002), 1-7 pgs.

Dierks, T., et al., "The TLS Protocol", RFC 2246, Network Working Group, (Jan. 1999), 1-75 pgs.

Schneier, B., "", Applied Cryptography: Protocols, Algorithms, and Source Code in C, John Wiley & Sons, 2nd Edition, (1996), 30-31, 351-355.

"Malaysian Application Serial No. PI20054144, Response filed Apr. 30, 2012 to Office Action mailed Jan. 31, 2012", With English Translation, 57 pgs.

"U.S. Appl. No. 10/933,696, Response filed Apr. 15, 2011 to Final Office Action mailed Oct. 18, 2010", 8 pgs.

"U.S. Appl. No. 10/933,696, Response filed Aug. 19, 2010 to Non-Final Office Action mailed Feb. 19, 2010", 8 pgs.

"International Application Serial No. PCT/US2005/028698, Demand filed Nov. 6, 2006", 22 pgs.

"International Application Serial No. PCT/US2005/028698, International Search Report mailed Aug. 8, 2006", 6 pgs.

"International Application Serial No. PCT/US2005/028698, Invitation to Pay Add'l Fees and Partial Search Rpt Rcvd mailed May 23, 2006", 8 pgs.

"International Application Serial No. PCT/US2005/028698, Written Opinion mailed Aug. 8, 2006", 10 pgs.

"Malaysian Application Serial No. PI 20054144, Response filed Nov. 26, 2012 to Office Action mailed Dec. 2, 2012", 3 pgs.

"Malaysian Application Serial No. PI 20054144, Substantive Adverse Examination Report mailed Oct. 31, 2012", 7 pgs.

"Malaysian Application Serial No. PI20054144, Office Action mailed Jan. 30, 2015", 2 pgs.

"Malaysian Application Serial No. PI20054144,Response filed Mar. 31, 2015 to Office Action mailed Jan. 30, 2015", 6 pgs.

* cited by examiner

DEVICE INTRODUCTION AND ACCESS CONTROL FRAMEWORK

CLAIM OF PRIORITY

This application is a divisional of U.S. patent application Ser. No. 10/933,696, now U.S. Pat. No. 8,146,142 filed on Sep. 3, 2004, priority to which is hereby claimed pursuant to 35 U.S.C. §121, and which application is hereby incorporated by reference in its entirety.

TECHNICAL FIELD

Various embodiments described herein relate to the field of wireless networks generally, including communications and network devices generally, including apparatus, systems, and methods for allowing network access from one device to another.

BACKGROUND

Various devices may operate wirelessly, communicating over radio frequency links or infra-red links in a network. Network security requires either physical isolation or cryptographic mechanisms or some combination of the two to assure that devices accessing the network are authorized to do so. Utility and/or security of the network may suffer as the techniques require increasing user attention and intervention to assure device verification.

Present network security either requires physical isolation or cryptographic mechanisms bootstrapped via some out-of-band (OOB) mechanism (or some combination of the two). Some out-of-band techniques require substantial user attention and intervention (such as entering passwords or examining digital certificates, names, or key identifiers). The user experience of some of these techniques is poor. To make matters worse, devices are increasingly multifunctional, with a variety of embedded applications and sharable resources that the user would like to selectively make available to other devices. These applications and services may operate at different layers of the software stack (communication stack), and credentials applicable at one level are not necessarily usable at another layer for a variety of reasons. Since each credential type may (and typically does) use a different method for trust bootstrapping, the user today is faced with the prospect of performing multiple separate trust bootstrapping operations to configure mutual trust between a given pair of devices. For devices with limited user interfaces, the complexity of current trust bootstrapping methods is such a serious obstacle that many devices simply omit security altogether or include only simple security built around extremely weak measures such as a 4-digit PIN (personal identification number).

BRIEF DESCRIPTION OF THE DRAWINGS

Embodiments of the present method and apparatus may be best understood by referring to the following description and accompanying drawings, which illustrate such embodiments. In the drawings.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description.

Embodiments of the present method and apparatus are directed to initial trust bootstrapping and provisioning of domain and/or role-based credentials.

Figure 1:
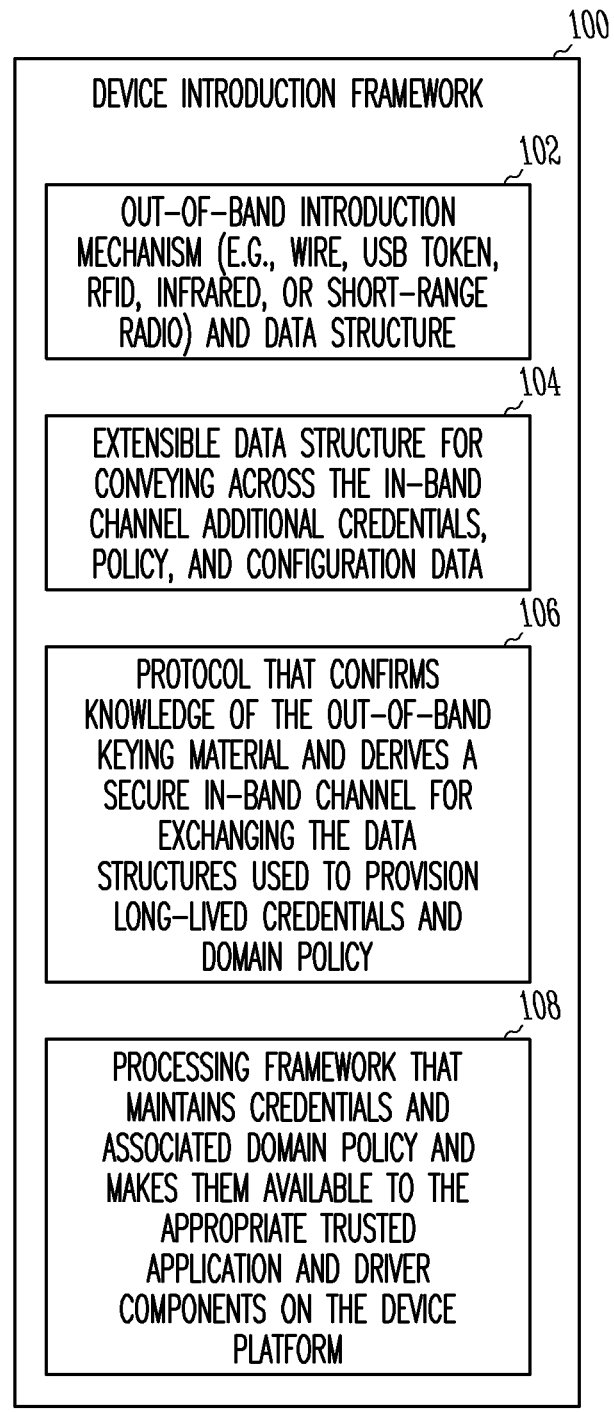
FIG. 1 depicts an embodiment of the present method and apparatus.

FIG. 1 depicts an embodiment of the present method and apparatus that addresses the problems in the prior art with a device introduction framework 100 that is extensible to bootstrap multiple applications and services at different layers in the communications stack.

The FIG. 1 embodiment of the present method and apparatus may have the following architectural elements: an out-of-band introduction mechanism (e.g., wire, USB token, RFID, infrared, or short-range radio) and data structure 102 for conveying keying material, names for user display, and in-band addressing information for the next phase of the credential and policy bootstrapping process; an extensible data structure 104 for conveying across the in-band channel additional credentials, policy, and configuration data associated with a domain to which one of the newly-introduced devices belongs; a protocol 106 that confirms knowledge of the out-of-band keying material and derives a secure in-band channel for exchanging the data structures used to provision long-lived credentials and domain policy; and a processing framework 108 that maintains credentials and associated domain policy and makes them available to the appropriate trusted application and driver components on the device platform.

Figure 2:
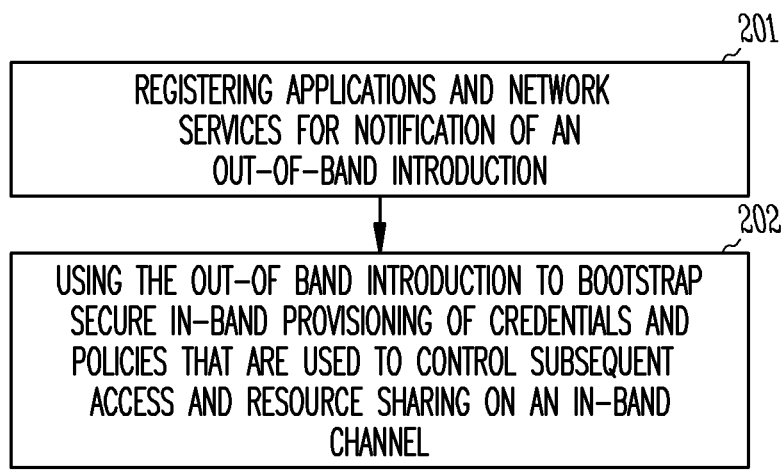
FIG. 2 depicts in very general terms an embodiment of the present method for bootstrapping applications and services.

FIG. 2 depicts in very general terms an embodiment of the present method for bootstrapping applications and services at different layers in a communications stack. This embodiment may include: registering applications and network services for notification of an out-of-band introduction (201); and using the out-of-band introduction to bootstrap secure in-band provisioning of credentials and policies that are used to control subsequent access and resource sharing on an in-band channel (202). These credentials may be domain credentials. The domain credentials issued to a newly added device may include implicit role-based authorization so that no additional access control configuration is needed after the introduction is complete.

In an embodiment of the present method and apparatus the domain credentials issued to a newly added device may include implicit role-based authorization so that in most cases no additional access control configuration is needed after the introduction process is complete.

Figure 3:
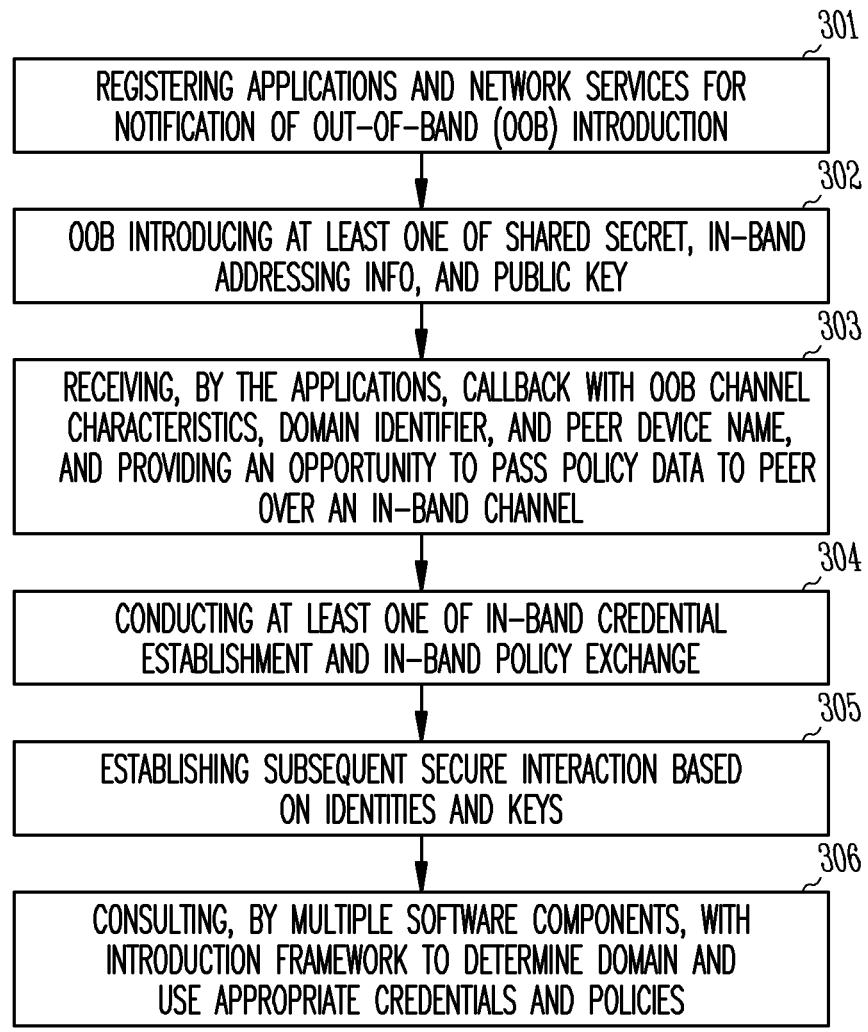
FIG. 3 depicts in general terms an embodiment of the present method.

FIG. 3 depicts in general terms an embodiment of the present method for an introduction process that provides a device introduction framework that is extensible to bootstrap multiple applications and services at different layers in a communications stack. This embodiment may have: registering applications and network services for notification of out-of-band (OOB) introductions (301); OOB introducing at least one of shared secret, in-band addressing info, and/or public key(s) (302); receiving, by the applications, callback with OOB channel characteristics, domain identifier, and peer device name, and providing an opportunity to pass policy data to peer over an in-band channel (303); conducting at least one of in-band credential establishment and in-band policy exchange (304); establishing subsequent secure interaction based on identities and keys (305); and consulting, by multiple software components, with introduction framework to determine domain and use appropriate credentials and policies (306).

In some embodiments of the present method and apparatus, applications running on a platform during subsequent operations may consult the processing framework for credentials and policy associated with a currently active domain. Since the framework may maintain a centralized policy store using an extensible data structure, service providers that own or manage devices can easily provision policy for a variety of different applications and services by updating the policy data for their domain. Globally unique domain identifiers may be used to prevent policy updates from one domain owner from overwriting policy associated with a different domain. At runtime, the processing framework may provide the appropriate policy to applications and services according to a currently active domain.

When digital devices need to securely share resources or communicate across networks (especially wireless networks), they must first establish a virtual security perimeter based on cryptographic keys. Of course, a device has no intrinsic understanding of its owner's goals or the trustworthiness of another device on the network. The security mechanisms and trust relationships used by the device must first be configured to reflect the desires of the device owner. The device owner in turn must have some means of conveying his intent that the devices work together. Translating the owner's intent into device configuration is variously known as provisioning or trust bootstrapping. Historically, many computing systems and applications have neglected the problem of trust bootstrapping and have simply assumed that initial shared secrets will be configured through some unspecified method. However, secure bootstrapping turns out to be a very challenging. Security vulnerabilities in trust bootstrapping processes and unwillingness of many users to follow good practices in managing credentials have done much to undermine the value and robustness of network security implementations.

Some embodiments of the present method and apparatus may include a framework for securely establishing initial trust relationships between wireless devices and for communicating those trust relationships to various operating system, device driver, and application software components. The intent is not to subsume or replace other security or access control mechanisms but rather to augment them by improving their trust bootstrapping.

Part of the framework is a user experience that is tangible and intuitive, based on physical operations such as pressing designated "introduction" buttons, moving devices close together, and/or physically connecting them to transfer introduction data from one device to another. The level of security achieved via this introduction process will depend upon the physical properties of the so-called Out-of-Band (OOB) channels and the cryptographic capabilities of the two devices.

It is well known that security has the following properties: the more complex a system the less likely it is to be secure, and the security strength of a system is limited by its least-secure element. System security is like a chain—only as strong as its weakest link.

Because of these properties, embodiments of the present framework are structured in well-defined layers, with simple mechanisms and protocols at the bottom and more complex mechanisms and applications higher up. This way, the lower layers can be made simple and sufficiently well understood to have a high degree of confidence in their integrity. Higher layers built on top of this foundation can stand or fall according to their individual security characteristics without compromising each others integrity.

Figure 4:
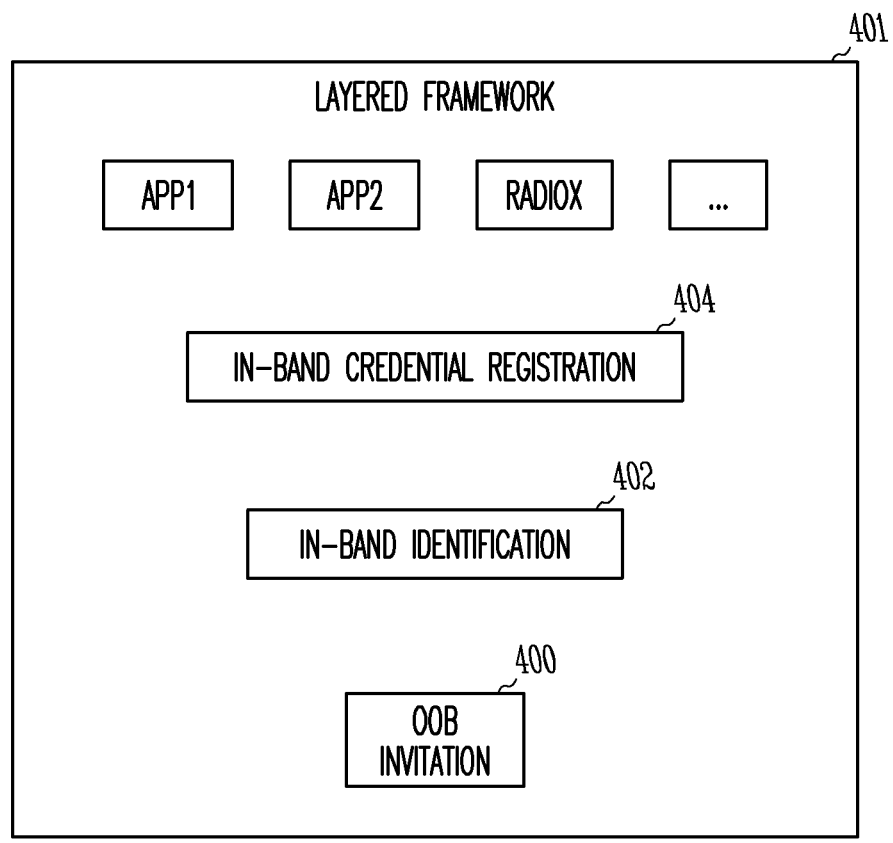
FIG. 4 illustrates an embodiment of a concept of layering in a layered framework.

FIG. 4 illustrates an embodiment of this concept of layering in a layered framework 401. The core elements may be represented by boxes 400 (OOB invitation), 402 (in-band identification), and 404 (in-band credential registration). Given these foundational elements, other applications and network security layers (App1, App2, Radiox, etc.) may be constructed on top (the AppN boxes correspond to the trust bootstrapping and configuration aspects of those applications).

Of course, it is not necessary that all software layers base their trust bootstrapping on this foundation. It is always possible for applications or network services to take care of all aspects of their own security and configuration on their own. However, embodiments of the present method and apparatus provide an opportunity for applications or service layers to take advantage of a common introduction process and thereby improve the user experience.

The following define various core elements:

Device. Devices are independent physical or logical entities that communicate with other devices across a network. Devices consume and/or provide resources to other devices on a peer-to-peer or master/slave basis. Devices may have heterogeneous capabilities in terms of computational power and I/O channels.

Domain. A Domain is a set of one or more devices that recognize a common authority over membership and access to network resources.

Enrollee. An Enrollee is a device seeking credentials to access a Domain resource. Once an Enrollee obtains a credential, it becomes a Member.

Member. A Member is a device that holds credentials of one or more Domains.

Resource Monitor. A Resource Monitor is a device mediating access to some resource. It requires a Credential to decide whether to permit a Member to access the resource.

Credential. A Credential is a data structure issued by a Registrar to an Enrollee, allowing the latter to authenticate itself as a Domain Member. The Credential in turn allows the Member to authenticate a Resource Monitor and a Resource Monitor to decide whether to permit the Member to access its resource.

Registrar. A Registrar is a device trusted by one or more Resource Monitors to administer a Domain. It issues an invitation to an Enrollee, establishes an Enrollment Security Association with it, verifies that the security association is with the correct Enrollee, and finally issues Member Credentials to the Enrollee. The Registrar may be a distinct physical entity from the Resource Monitor, or it may be integrated into the Resource Monitor but logically distinct. The role of Registrar may be played by any or all of the Devices in a Domain, depending upon the Domain policy.

Invitation Protocol. An Invitation Protocol is an optional out-of-band protocol between a Registrar and an Enrollee. This protocol transfers parameters from a Registrar to the Enrollee to enable the Enrollee to locate and mutually authenticate with the Registrar using the Identification Protocol.

Identification Protocol. An Identification Protocol is a two-way in-band protocol between the Enrollee and the Registrar that establishes an Enrollment Security Association.

Enrollment Security Association. An Enrollment Security Association is state shared between the Enrollee and Registrar to protect the provisioning of a Credential.

Verification Protocol. A Verification protocol is an optional out-of-band protocol between the Enrollee and the Registrar that is used after the Identification Protocol and prior to the Registration Protocol.

Registration Protocol. A Registration Protocol is a (logically) three party protocol to assign a Credential to the Enrollee. The protocol operates between the Enrollee and the Resource Monitor, via the auspices of the Registrar.

Embodiments of the present method and apparatus may also involve an introduction ceremony. In general, a ceremony is a collection of coordinated management activities, out-of-band protocols, and in-band protocols, which work together in a prescribed fashion to accomplish some end. An introduction ceremony "introduces" two computing devices that have never before met and have no common root of trust. The ceremony goal is to securely establish credentials, so the pair of devices (and by extension others belonging to the same domain) need not be introduced again.

Figure 5:
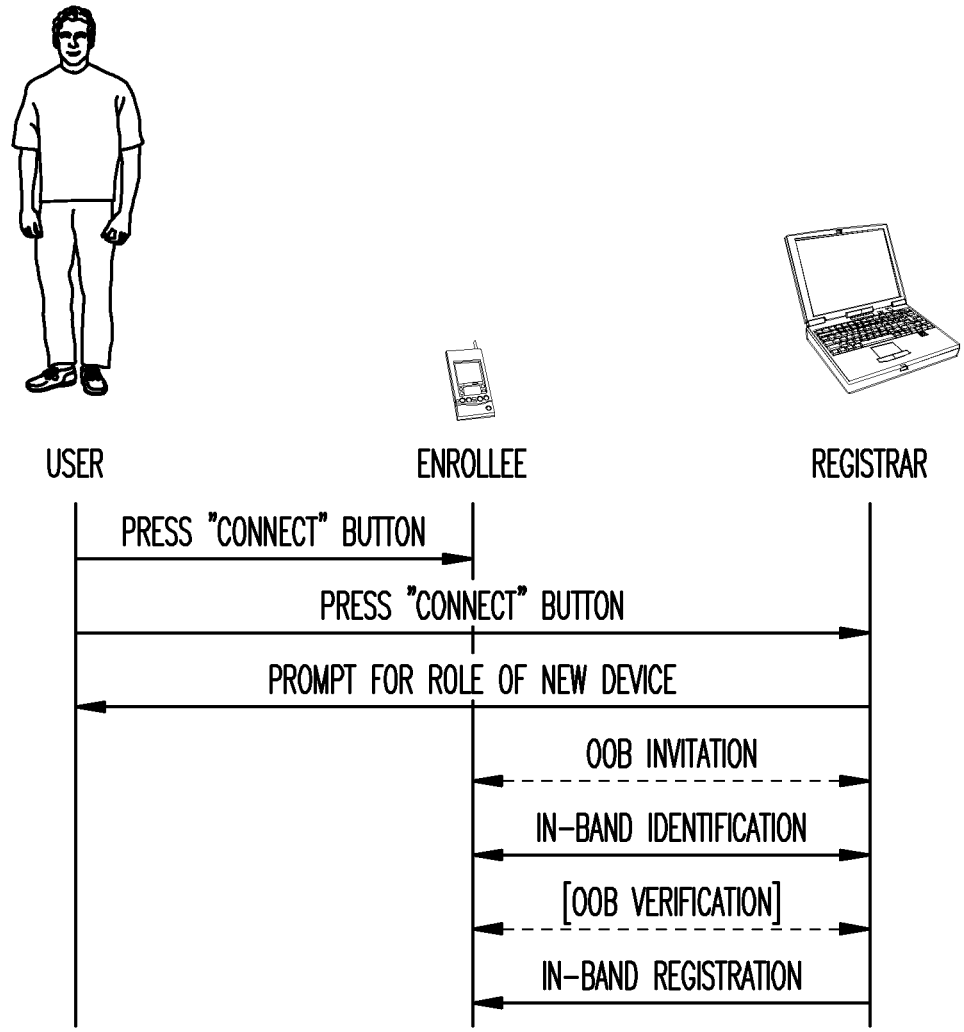
FIG. 5 illustrates an example embodiment of an introduction ceremony.

FIG. 5 illustrates an example embodiment of an introduction ceremony. In this embodiment of the present method and apparatus, the verification protocol is depicted in brackets because it may be omitted if the invitation protocol is used. Transport for the identification protocol between an enrollee and a registrar may use a temporary guest credential, a separate logical or physical network used only for enrollment, or a framework such as 802.1X that permits only limited access to the network prior to domain enrollment. A given domain may include multiple registrars. Devices acting as registrars may also be resource monitors.

Some devices may choose to respond differently to subsequent introduction attempts once they have been successfully enrolled in a domain. For example, after initial enrollment, a device may reject attempts to enroll it in other domains unless this is explicitly authorized by the original domain. Typically, a "factory reset" capability is included in such devices to enable recovery from failure of the domain authority.

The initiation of an introduction may ordinarily be accomplished by some user action such as pressing designated "connect" or "introduction" buttons on the two devices. The introduction needs to reflect the user's intent, and introductions that happen entirely automatically and without the user's involvement are likely to violate this principle. Once the user has indicated to the registrar that an introduction is needed, the registrar may prompt the user for the desired role to assign the enrollee. This information will be used in the registration protocol when deciding which credential to issue to the new member. Note that the role assignment is optional.

Execution of an invitation protocol initiates enrollment. The invitation protocol transfers out-of-band parameters between the registrar and the enrollee. These parameters allow the enrollee to locate and subsequently authenticate the correct registrar using the identification protocol. Although it is possible for an invitation protocol to transfer parameters in either or both directions, the invitation protocol may transfer parameters one-way from the registrar to the enrollee. By limiting the exchange to one way, it becomes possible to implement the protocol with one-way out-of-band channels and simplifies the user experience when using introducer devices that are carried from the registrar to the enrollee.

The specific parameters transferred by the invitation protocol may vary according to the characteristics of the out-of-band channel and the capabilities of the registrar and enrollee. Typical values may include:

Message type and version—makes the invitation message format extensible;
In-band network descriptor for the identification protocol (type and/or network identification);
Registrar's public key identifier;
Registrar's in-band network address for the identification protocol;
Temporary in-band network access credential; and
Identification protocol type and options (may be implicit in message type).

To improve resistance to attacks against the out-of-band channel, especially if an introducer device is used, the registrar may assign an expiration time to an introduction secret and reject it after that time, or to expire the introduction secret after its first use.

Once it has received out-of-band parameters via the invitation protocol, the enrollee may use these parameters to initiate the in-band identification protocol with the registrar. This protocol may mutually prove possession of cryptographic keys by the enrollee and the registrar and establishes an enrollment security association that may be used to protect the registration protocol.

The identification protocol is typically not run across the same out-of-band channel as the invitation protocol because some out-of-band channels have very limited bandwidth, and some are unidirectional. For example, RFID (radio frequency identification) tags have both of these limitations. USB flash drives have ample bandwidth but are unidirectional (unless the user shuttles the drive back and forth multiple times between the devices, which is unworkable). In an embodiment of the present method and apparatus the invitation protocol may only require a one-way distribution of initial network addresses, and public key identifiers, and may be readily adapted to channels with these limitations. The identification and registration protocols, which typically involve mutual authentication, private key proof of possession, and certificate issuance, may require a bi-directional channel with moderate bandwidth.

Figure 6:
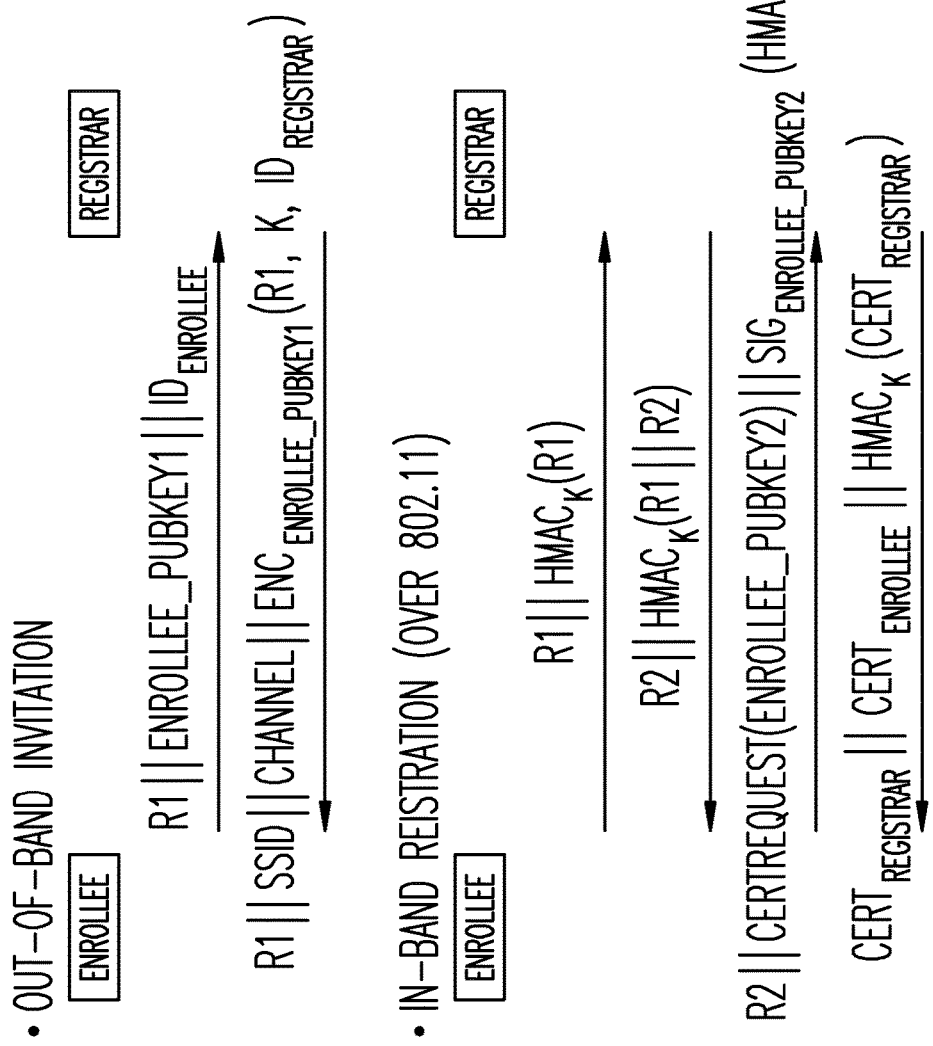
FIG. 6 depicts an embodiment of an alternative secure introduction embodiment.

In some embodiments, a single round-trip may be performed using the out-of-band channel to establish an enrollment security association for use by the registration protocol or for direct use as a credential for network access. In this case, the identification protocol may be omitted. FIG. 6 illustrates an example of this type of introduction ceremony.

When the verification protocol is used, it transfers information that allows the enrollee and the registrar to verify that the enrollment security association has been established with a designated peer. The verification protocol may typically only be used if the invitation protocol is omitted or if the invitation protocol's out-of-band channel properties or parameters provide insufficient authentication of the peer.

The registration protocol is used to issue credentials to the enrollee. It is protected by the enrollment security association that is established by the identification protocol or by the invitation protocol.

A single introduction ceremony may result in the establishment of multiple credentials of different types. This is because devices often contain multiple applications and networking layers, each of which may require an independent credential. Indeed, it is often beneficial to keep such credentials separate, because shared credentials used concurrently in different contexts are more susceptible to attack than independent credentials.

For security reasons, it is desirable that the introduction ceremony maintains perfect forward secrecy between the invitation protocol and the identification protocol. In other words, if an eavesdropper records the encrypted message exchanges of the identification and registration protocols and subsequently obtains the out-of-band data passed in the invitation protocol, this information should not enable it to compromise the credentials established in the registration protocol. Likewise, later disclosure of data exchanged in the verification protocol should not compromise the credentials. An alternative approach for protecting against disclosure of the invitation secret on the out-of-band channel is to encrypt this data using public keys so that an attacker that eavesdrops on the out-of-band channel cannot thereby discover the secret and compromise the introduction. FIG. 6 illustrates this latter approach.

Embodiments of the present method and apparatus are agnostic to the specific out-of-band channel that may be for the invitation protocol. Nevertheless, some guidelines may be provided to ensure that the out-of-band channel has appropriate characteristics for secure device introduction.

Some out-of-band channels are more resistant to eavesdropping than others. For example, physical wires and USB flash drives are more resistant to eavesdropping attacks than are infrared or RFID. Public keys may be utilized for introductions using channels susceptible to eavesdropping.

Out-of-band channels such as USB flash drives typically have ample capacity to transmit large quantities of data. Others, such as RFID, may have very limited capacity. In the latter case, a compact binary format of the minimal data may be utilized to establish a connection and bootstrap initial trust on the in-band channel.

One characteristics of a good out-of-band channel for introduction is that it allows the user to unambiguously express which two devices are being introduced. For this purpose, channels that ensure physical proximity of either the devices or an introducer device may be utilized. Out-of-band channels may also include a physical point-to-point wire. This has the advantage of resistant to eavesdroppers, high bandwidth, and simple and intuitive to implement and to use. However, this has the disadvantage of being impractical or unusable if devices are far apart, user may be confused about why a wire is needed to set up a wireless device, and may require an extra connector.

Out-of-band channels may also include an USB flash key or equivalent device. This has the advantage of resistant to eavesdroppers, high bandwidth, and is a fit metaphor of physical "security key". However, this has the disadvantage of an extra device that a user may lose or misplace, extra expense for the key, extra expense for USB host interface and connector on devices.

Out-of-band channels may also include the use of infrared. This has the advantage of being very inexpensive, and is built-in already too many devices, especially consumer electronics. However, this has the disadvantage of being susceptible to eavesdroppers in the same room, physical proximity is not as precise as wire or USB key, and monitoring infrared channel consumes power. This may be an issue for small battery-powered devices. Aligning directional infrared ports is not always easy or even possible (if devices cannot be moved or are far apart). This disadvantage may be overcome using a portable IR-based introducer device.

Out-of-band channels may also include near field communications and RFID (radio frequency identifier). This has the advantage of being fully wireless, no external connector needed, no need to precisely orient devices being introduced. However, this has the disadvantage of being susceptible to eavesdroppers, has limited channel data capacity for RFID, and currently less widely available than other channels mentioned previously.

Access control is the process by which a device accepts or rejects a request by a peer device to perform some action or obtain some data. Access control may be rooted in an access control list that maps credentials of other members or domain authorities onto corresponding privileges. If domain authorities are used, then credentials issued by that domain may convey a subset of the domain privileges to the credential holder. When a device receives a request, it may first obtain the credential(s) of the requester. It may then determine based on the credential and the access control list whether or not to grant the request.

If role-based access control is used, the following subcategories of members are often useful. These roles may be assigned directly in the issued credentials or may be associated with the credentials using a data structure in the resource monitor. An administrator is a member with access permissions that are a superset of ordinary members. A guest is a member with access permissions that are a subset of ordinary members.

There are two main alternatives to enable cross-domain access control, where a Resource Manager requires Members to present Credentials issued by more than one Domain to obtain access. One possibility is that cross-certification may be performed (i.e., a Domain authority issues a certificate for another Domain authority). Such cross-Domain credentials must accurately reflect the desired semantics to avoid granting unintended permissions. Another possibility is that a Resource Manager may recognize multiple Domains and require multiple independent Credentials be provided by a Member to gain access.

In some circumstances, a user may wish to remove security associations and/or revoke Member access granted through a prior introduction. A straightforward method of accomplishing this is to unilaterally delete data associated with that introduction using a device's user interface. For devices such as laptop computers, this may be readily accomplished due to the large display and rich I/O capabilities. For headless devices, the problem is more difficult. Therefore, a special mode of the Registration Protocol may be used to revoke Security Associations and/or Credentials associated with a prior introduction. This function may be initiated by either the Registrar or the Member. Note that one Device cannot ultimately force another Device to forget a key. All it can do is signal its own intention to revoke a key and request that the peer do likewise.

The efficacy of the revoke operation will depend upon the type of credential and access control mechanism. For example, if access control is solely based on checking the root signature of certificates signed by a Domain, then if the device holding the Credential refuses the revocation request, it may be necessary to wait for certificate expiration to implicitly revoke access. Alternatively, a certificate revocation list may be maintained (although maintenance of such lists has proven to be a substantial burden in PKI deployments). An additional option is to maintain separate access control lists that may be edited to revoke privileges previously granted to specific Domain Members. In this case, the Credentials would continue to be valid, but the privileges conveyed by them would be removed.

As described in earlier sections, the process of introducing a device to a domain is accomplished via a combination of protocols, viz. Invitation Protocol, Identification Protocol, Verification Protocol and Registration protocol.

Some devices may be able to support relatively heavyweight Public Key encryption, whereas others may only have the capability of supporting lightweight symmetric key encryption. Accordingly, the Introduction Ceremony may have the following flavors: Symmetric Key only Introduction; Symmetric Key+Public Key Introduction; and Public Key only Introduction.

The following describes how the Introduction Ceremony may be performed using Symmetric Key and/or Public Key methods.

The Invitation Protocol may use a one-way OOB channel from the Registrar to the Enrollee. Ceremonies using the Symmetric Key and the Symmetric Key+Public Key use a common Invitation Protocol.

---

Registrar → Enrollee: RegistrarAddress | Key | KeyId [ | hash(PublicEncryptionKey)]

---

Here, RegistrarAddress is the address of the registrar on the InBand channel. The address may vary based on the transport used to convey the Introduction Protocol. It may be a MAC Address or an IP Address with an optional TCP port number.

Key is a randomly generated Symmetric Key used by both parties to secure their session. It is composed of two separate keys, the Key Confirmation Key and the Key Encryption Key.

Key: KCK|KEK

KeyId is used by the Registrar to identify the Key from other Keys it generates for other Enrollees. The KeyId is randomly selected, making it infeasible to compute the Key from the KeyId i.e. the Key→KeyId mapping is One Way.

Hash(PublicEncryptionKey) is the hash of the Public Encryption Key used by the Registrar. This fingerprint is used by the Enrollee to verify the Registrar's public key in the Identification Protocol.

Capability permitting, the Registrar should always include the hash of the Public Encryption Key in the Invitation message. This provides the Enrollee with the option of using either the Symmetric Key Only or Symmetric Key+Public Key method for the Identification protocol.

If a device does not support an independent hardware channel with the appropriate characteristics for secure transmittal of Invitation data, then verification of the data must be performed through the Verification Protocol (for instance, including visual comparison of key identifiers or device serial numbers)

The Invitation Protocol may provide the Enrollee with the Registrar's In-Band address and other parameters needed to finish the Introduction Ceremony. The Enrollee may now connect to the Registrar In-band and begin the Identification Protocol. Typically, the Registrar provides the Enrollee with the option of using either Symmetric Only or Symmetric+Public Keys to secure their session. Given sufficient capability, the Enrollee should always choose the latter option since it has better security features than using only Symmetric Keys.

The Identification Protocol therefore has two possible flavors as follows.

The Symmetric Key Only Introduction Protocol is the case where the Enrollee decides to use only symmetric keys to secure the session with the Registrar. The Introduction Protocol is as follows:

---

Enrollee → Registrar:  M1 = Random1 | KeyId
Registrar generates a random key K1 and computes α = KeyWrap(KEK, K1)
Registrar → Enrollee:  M2 = Random1 | Random2 | KeyId | α | MAC(KCK, Random1 | Random2 | KeyId | α)
Enrollee generates a random key K2 and computes β = KeyWrap(KEK, K2)
Enrollee → Registrar:  M3 = Random2 | KeyId | β | MAC(KCK, Random2 | KeyId | β)
Enrollee and Registrar compute key K = kdf(K1, K2, KeyId, K-Length)

---

In Message M1, the Enrollee generates a random string Random1 and sends it to the Registrar along with the KeyId. The KeyId assures the Registrar that the Enrollee is indeed the recipient of the message sent in the Invitation Protocol.

Message M2 contains both, Random1 and a MAC computed using the KCK. This assures the Enrollee that it is indeed communicating with the Registrar. Message M2 also contains a second random string Random2 and a random key K1, which forms the first part of the session key K.

Random2 and the use of the KCK in message M3 serve as further verification of the Enrollee. Also, Random2 assures the Registrar that the Enrollee received message M2 correctly. The key K2 serves as the other half of the session key K.

Following this message exchange, the Registrar and the Enrollee compute the session key K using K1 and K2.

The Symmetric Key+Public Key Introduction Protocol is the case where the Enrollee decides to use both the Symmetric Key and the Public Key to secure the session.

---

Enrollee → Registrar:  M1 = Random1 | KeyId | hash(PublicEncryptionKey)
Registrar generates a random seed S1 and computes α = KeyWrap(KEK, S1)
Registrar → Enrollee:  M2 = Random1 | Random2 | KeyId | α | PublicEncryptionKey | MAC(KCK, Random1 | Random2 | KeyId | α | PublicEncryptionKey)
Enrollee generates a random seed S2 and computes β = Encrypt(PublicEncryptionKey, S2 | KeyId)
Enrollee → Registrar:  M3 = Random2 | KeyId | β | MAC(KCK, Random2 | KeyId | β)
Enrollee and Registrar compute K = kdf(S1, S2, KDK | KeyId | hash(PublicEncryptionKey), K-Length)

---

In Message M1, the Enrollee generates a random string Random1 and sends it to the Registrar along with the KeyId and the hash of the Public Encryption Key (PEK). The KeyId and hash assure the Registrar that the Enrollee is indeed the recipient of the message sent in the Invitation Protocol. Also, the hash serves as an indication that the Enrollee wishes to use the PEK along with the Symmetric Key to secure the session.

Again, the Enrollee uses Random1 and KCK to verify the Registrar, while the Registrar uses Random2 and KCK to verify the Enrollee.

Seeds S1 and S2 are used to compute the session key K.

Since the out-of-band channel may be one-way, and since out-of-band channels may use a wide range of possible physical transport mechanisms, one aspect of the out-of-band introduction stage is the schema, or format of the information. Ideally, the same information may be conveyed across a wide variety of out-of-band channels, and the code in both the sender and the receiver may be largely agnostic to the channel itself. However, since some out-of-band channels have very limited bandwidth, it is desirable to define a compact format for this data. An extensible (XML) format as well as a compact (binary) format may be used for the out-of-band data.

FIG. 6 depicts an alternative secure introduction embodiment. In FIG. 6 E designates a public encryption key. SSID is the 802.11 network identifier. WPA-PSK is the new link-layer security solution for 802.11 home networks defined by Wi-Fi Alliance.

In embodiments of the present method and apparatus a framework for multi-layer bootstrapping based on a single introduction may include the following:

- A device introduction service is created with a user interface and an application program interface (API) that applications aware of this service may utilize to help bootstrap their trust and policy.
- Using the API, an application may register interest in device introduction events.
- When the user wishes to perform an introduction, the user may use the introduction service's API to indicate this. The introduction service may perform platform-specific operations to further secure the OOB channel(s) at this point. For example, it may configure the device drivers to authenticate data received across the I/O channel to prevent undetected modification by viruses or other hostile software running on the platform.
- When an introduction event occurs, the introduction service may notify registered applications and provides them an opportunity to reserve keying material and to provide application-specific configuration data to corresponding applications that may be running on the peer device. The introduction service may also provide registered applications with an opportunity to display one or more user interface pages integrated with that of the introduction service (possibly as a separate tab on a tabbed dialog or a separate page in a wizard-driven interaction).
- Applications that provide configuration data to peers may also supply an application identifier that may be used to extract the application-specific configuration from the introduction exchange. The API, which may be provided by the introduction service running on each device, enables the delivery and lookup of data based on application identifiers. The introduction service may use the secure channel established via the invitation or identification protocols to authenticate and/or encrypt the configuration and policy data sent across the in-band channel in the registration protocol.

If applications or higher-level network services request key material from the introduction service, a description of the complete set of requests may be constructed and delivered as part of the registration protocol. For example, the registration protocol may derive a master session key to protect its messages. This key may be expanded into additional keying material using well-known key derivation functions (e.g., by repeatedly applying a pseudo-random function to the master session key). A mapping between application identifiers and regions in the derived keying material may be exchanged as part of the registration protocol so that in addition to retrieving policy data, application-specific keying material may be obtained from the introduction service. Note that the registration API may allow applications to designate key identifiers to use to encrypt their session keys and configuration data so that applications can protect their configuration and keys from each other. When the introduction service receives configuration data and derives keys for a given application, it first encrypts this data using the keys of those applications prior to storing it.

The Introduction Service's registration API may be used by multiple applications. Each application may indicate an application ID, data to exchange, a local encryption key identifier to protect the data, and zero or more UI plug-ins. When an introduction occurs, the master secret (enrollment security association) used by the registration protocol may be expanded using a pseudo-random function and the application identifier into application-specific session keys. These keys may then be protected from other applications on the platform by encrypting them using the local encryption keys designated during application registration. Likewise, when data corresponding to each application is received from the peer, it may first be encrypted using the application-specific session key before being made available to applications on the platform. In this way, when applications query the Introduction Service to retrieve keys and data associated with their application IDs, they may have at least a degree of assurance that the data has not been tampered with and cannot be read by other unauthorized applications. The actual level of assurance and application isolation may depend upon the inherent security properties of the host hardware and operating system.

Radio-Based in-Band Channel for OOB Channel

Network security either requires physical isolation from untrusted machines or cryptographic mechanisms bootstrapped via some out-of-band (OOB) introduction mechanism (or some combination of the two). There are two forms of OOB channels: physical and logical. A physical OOB channel typically employs independent I/O hardware from the main in-band channel(s). A logical OOB channel uses some other mechanism such as human memory or visual comparison of representations of cryptographic keys. Physical OOB channels have significant usability advantages over logical OOB channels, but they do suffer from some drawbacks. In particular, if a device does not already support multiple independent I/O channels, then adding this capability will make the device more expensive to produce. It can also be problematic to ensure that the same physical OOB channel type is supported for each pair of devices that must be introduced to each other.

For these reasons, there is substantial incentive to use the same in-band channel for both trust bootstrapping as well as subsequent secure communication. Existing approaches to this problem basically fall into two categories: 1) use a logical OOB channel. This approach typically requires either trusted third party certification or requires the user to input a shared password or do manual comparison of cryptographic keys displayed by the devices. 2) apply weak measures such as pressing a button that puts a device in a promiscuous mode to receive an unprotected key over the in-band channel. Method 1 either requires expensive PKI infrastructure or requires the user to correctly perform relatively complex tasks such as typing an identical and secure password into each device. Method 2 is only pseudo-security. It offers no meaningful protection against an attacker with access to the in-band channel at the time of introduction. However, embodiments of the present method and apparatus provide an improved and novel third alternative: modifying the operation of the in-band hardware so that it approximates an OOB channel. This approach obtains the benefits of hardware-based OOB channels without incurring the expense of an independent I/O subsystem.

A good physical OOB channel has two properties: 1) it is resistant to impersonation and man-in-the-middle attacks by virtue of the physical properties of the channel, and 2) it is widely available and easy to use. Examples of good OOB channels include infrared, audio, visual (e.g., printed barcodes or equivalent), RFID, point-to-point physical wires, and memory tokens such as portable USB flash drives. A common characteristic of these OOB channels is that they allow a digest of a key and/or a key itself to be imported into a device based on physical proximity of some sort. The physical proximity property is crucial, because this makes remote impersonation and man-in-the-middle attacks much more difficult. Physical proximity helps a user to know that their device is actually communicating with the intended peer device as opposed to that of an attacker. Introduction methods based on physical OOB channels with proximity are typically quite good at reflecting the intent of the user. Logical OOB channels are more easily subverted, since they often rely on a technically sophisticated and security-conscious user.

Embodiments of the present method and apparatus provide a radio-based in-band channel that approximates the properties of an OOB channel. These embodiments attenuate the signal strength of the radio significantly so that the range of the radio is diminished to a few inches. Thus the in-band radio function has similar properties to an infrared channel or RFID transponder. The problem with a naïve implementation of this approach, however, is that attackers with more powerful antennas could fool a device into thinking that it is communicating with another device in close physical proximity.

In some embodiments of the present method and apparatus resistance is added to remote amplified antennas by taking advantage of physical properties of the radio signal propagation. Electromagnetic energy emitted by a non-directional antenna diminishes in intensity as the square of the distance from the antenna. This means that if the signal strength is X at 5 inches from the source, it will be X/9 at 15 inches. Thus, weak radio signals rapidly diminish in intensity over a short distance. If the devices being introduced can not only reduce their own in-band signal strengths but can also measure the signal strength gradient of signals received from their peers in real-time, then physical proximity can be reliably detected.

Some embodiments of the present method and apparatus rely on the steep signal gradient of very short-range radios. Embodiments of the present method and apparatus may embed a signal gradient detector or a secondary antenna that is physically separated on the device far enough to detect the slope of the signal strength gradient during introduction, when the radio signal strengths are greatly reduced. The physical separation and the required sensitivity of the antennas will depend upon the specific device geometries. If the effective range of the introduction signal is five inches or less (which is desirable to increase assurance of close proximity), then the needed antenna separation would probably be on the order of an inch or two. If the precision of the gradient sensitivity is increased, then even less separation is needed. For example, a signal gradient sensor may be integrated into the wireless chip itself.

Buttons may be pressed on each device at the start of an introduction. The devices each may respond by reducing their signal strengths to an effective range of five inches or less. The user may then move the devices close together. They detect each other's signal and at the same time measure the signal gradient by simultaneously measuring the signals received on both antennas. Any signals that do not diminish according to an acceptable profile are rejected as potential attacks. If a signal does have the correct strength gradient, cryptographic material (such as public keys or key identifiers, but not precluding symmetric keys) is received across that channel and subsequently used to establish secure connections on the in-band channel after introduction. At least part of the signal that delivers the keying material is checked for the appropriate signal strength gradient. This effectively binds the proximity information with the keying material.

Even if only one of the radios is capable of signal strength measurement, embodiments of the present method and apparatus can still help make the channel more resistant to attack since the user interface on that device will indicate that it did not successfully establish a connection. The user attempting an introduction can at that point abort the introduction operation on the other device and try again. If neither device can measure signal strength, then the introduction method will still work, but it will have some susceptibility to remote attackers. Therefore, embodiments of the present method and apparatus scale well in that they do not require all devices to implement the advanced capabilities. Some security benefit may be obtained with simple signal attenuation; greater benefit may be obtained if one device has a gradient detector; maximum benefit may be obtained if both devices have gradient detectors.

Although remote attackers can manipulate their signal strength in real time, they cannot manipulate the instantaneous signal strength gradient of the signal they emit. The latter property is a fundamental characteristic of radio signal propagation.

Forming a constellation of devices requires the devices be introduced to each other securely and with minimal user intervention. Using an out-of-band (OOB) mechanism is one way of bootstrapping trust. The OOB channel may be used to pre-configure the devices with authentication information and other information, which helps them to connect using the regular (in-band) channels.

Media used for OOB communication can be broadly classified into one-way (e.g. USB flash storage, floppy disks etc) and two-way (IR).

When two-way OOB media are used for the OOB exchange, both participating devices can be pre-configured with the information that will be used during the in-band authentication phase. This simplifies the later in-band message exchanges.

Using one-way media, one device "pushes" its authentication information, while the other device only reads this information. This poses some challenges during the in-band authentication because now only one device has the authentication information pre-configured before connection.

One-Way OOB Channel

Embodiments of the present method and apparatus provide bootstrap authentication information using a one-way OOB channel and subsequent in-band messages.

When a one-way OOB channel is used to convey authentication information, there are two possible scenarios: One where the sender is the server and the other where the sender is the client. Here, client refers to a device that wishes to be enrolled in the device constellation, and server is the device that has the authority to authenticate and subsequently authorize the client to become a part of the constellation.

Figure 7:
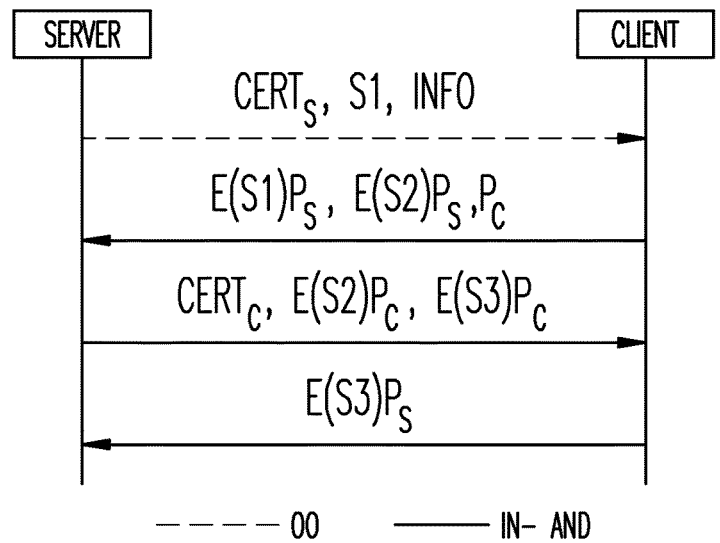
FIG. 7 depicts a scenario where the server initiates the connection.

FIG. 7 depicts a scenario where the server initiates the connection.

The embodiment in FIG. 7 has the following elements:
CERTs—Server's certificate
S1, S2, S3—Randomly generated secrets
Info—Server's connection info
E(S1)Ps, E(S2)Ps, E(S3)Ps—Secrets encrypted using the Server's Public key
CERTc—Client's certificate
E(S2)Pc, E(S3)Pc—Secrets encrypted using the client's public key Regarding the OOB message in FIG. 7:

The server sends its certificate, a randomly generated secret (S1) and some connection information to the client over the OOB channel.

Regarding the in-band messages in FIG. 7:

The client connects to the server over the in-band channel and sends the secret (S1) encrypted with the server's public key, another randomly generated secret (S2) also encrypted with the Server's Public Key and the Client's Public Key.

The server decrypts the secret (S1) and verifies that this is the same client to which it had sent the OOB data. If the server decides to allow the client to join the constellation, it creates a certificate for the client with the Client's Public Key. Using the Client's Public Key, it encrypts the secret (S2), and another randomly generated secret (S3). The server then sends these items to the client.

The client decrypts the secret (S2) with its public key and verifies that its previous message (#2) had reached the server. The client certificate can now used for future transactions. The client, after decrypting S3, encrypts it again using the Server's Public Key, and sends it to the server as a guarantee that the server's last message (#3) reached it.

After this, normal communication between the client and the members of constellation can start.

Figure 8:
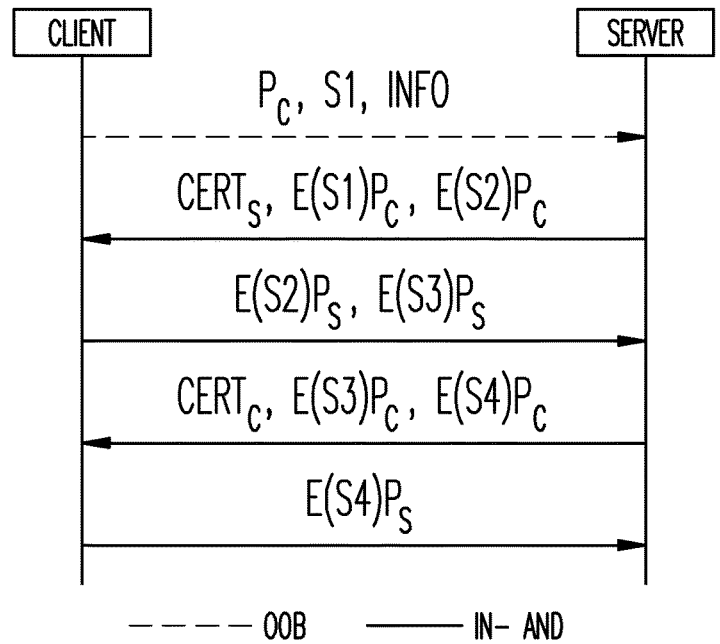
FIG. 8 depicts a scenario where the client initiates the connection.

FIG. 8 depicts a scenario where the client initiates the connection.

The embodiment in FIG. 8 has the following elements:
Pc—Public key of the client
S1, S2, S3, S4—Randomly generated secrets
Info—Client's contact information
CERTs—Server's certificate
E(S1)Pc, E(S2)Pc, E(S3)Pc, E(S4)Pc—Secrets encrypted using the
Client's Public key
E(S2)Ps, E(S3)Ps, E(S4)Ps—Secrets encrypted using the server's Public key
CERTc—Client's certificate Regarding the OOB message in FIG. 8:

The client sends its public key and a randomly generated secret (S1) and some connection information to the server over the OOB channel.

Regarding the In-Band messages in FIG. 8:

If the server decides to deny entry of the client into the constellation, it need not do anything further. If the server decides to allow the client into the constellation, it connects to the client over the in-band channel and sends the secret (S1) encrypted with the Client's Public Key, the server's certificate and another randomly generated secret (S2) also encrypted with the Client's Public Key.

After verifying the secret (S1), the client is assured that this is the same server to which it sent the OOB message.

The client encrypts the secret (S2), and a newly generated secret (S3) with the Server's Public Key and sends it to the server.

The secret (S2) assures the server that the client received its previous message (#2). The server creates a new certificate for the client. It encrypts the secret (S3), and a newly generated secret (S4) with the Client's Public Key. It then sends the certificate and the two secrets to the client.

Receiving S3 assures the client that the server received its previous message (#3). It then sends a message to the server with the secret (S4) encrypted using the Server's Public Key, as an assurance that it received message #4 from the server.

Normal communication between the client and the members of the constellation can begin after this point.

Two-Way OOB Channel

Embodiments of the present method and apparatus bootstrap trust between two communicating devices using a two-way OOB channel with very little or no user intervention. Examples of two-way OOB channels are Infrared ports on laptop PCs or a cross-over Ethernet cable connecting the two devices.

Figure 9:
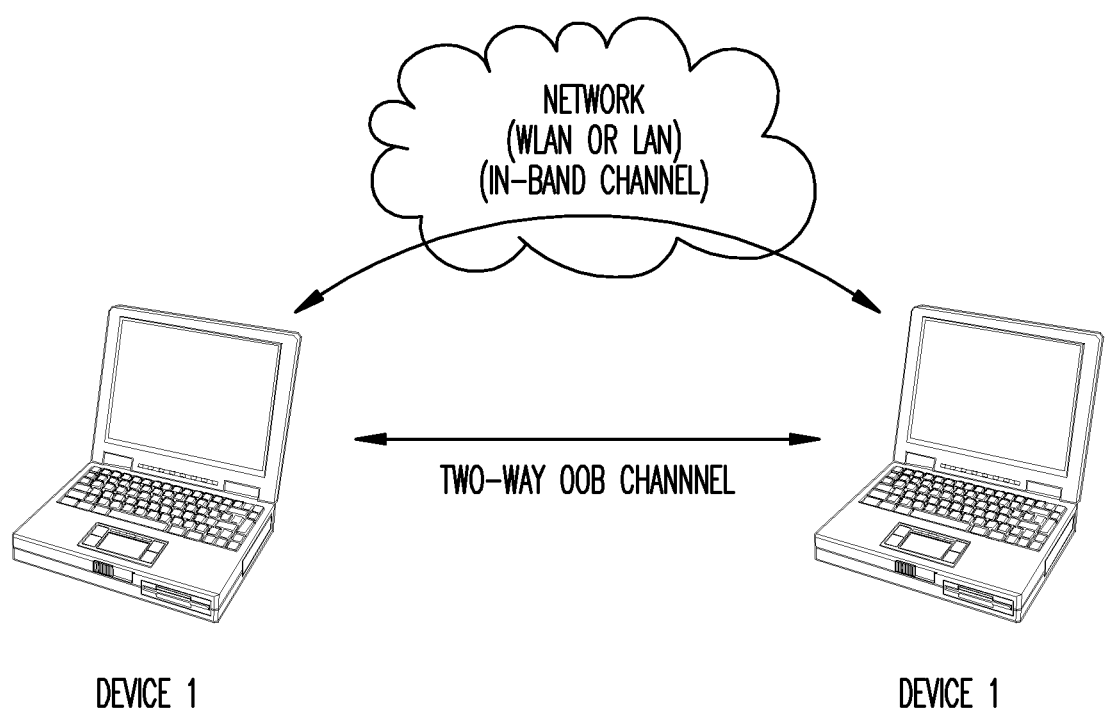
FIG. 9 depicts two devices that want to conduct secure communications using a network that is also shared by many other devices/users.

FIG. 9 depicts an embodiment with two devices that want to conduct secure communications using the network that is also shared by many other devices/users. This network, which could be wireless LAN or wired LAN, is referred as the in-band channel. In order to bootstrap trust, they use another connection, which, by nature of its physical properties is deemed secure. This connection may be a two-way channel. For example, this could be two-way Infra Red or a small cross-over Ethernet cable and is referred to as the OOB channel.

FIG. 9 shows laptop personal computers as devices, Device1 and Device2, but they could be any communicating device. The two-way OOB channel used is secure from any kind of attack because of its physical properties. Basically, a human must be able to infer from just looking at the physical connection that a third device cannot intercept the communication and that the two devices are the intended peers to each other. If a cross-over Ethernet cable is used, it can be seen by human eyes that it is connected to the two devices. If an infrared channel is used, by its directionality and short range, humans can be sure that a third device cannot interpose itself with a man-in-the-middle attack. Since public key techniques are used to protect the OOB exchange, passive eavesdroppers on the OOB channel cannot learn any secrets that would enable them to violate the security of the system.

First, the two devices are connected via the two-way OOB channel for the bootstrapping. They exchange some information between them on the OOB channel. Then, the two devices connect to each other on the in-band channel. Using the information exchanged on the OOB channel, the two devices are able to prove to each other that they are the intended peers and also able to exchange encrypted messages between them for secure communication.

Figure 10:
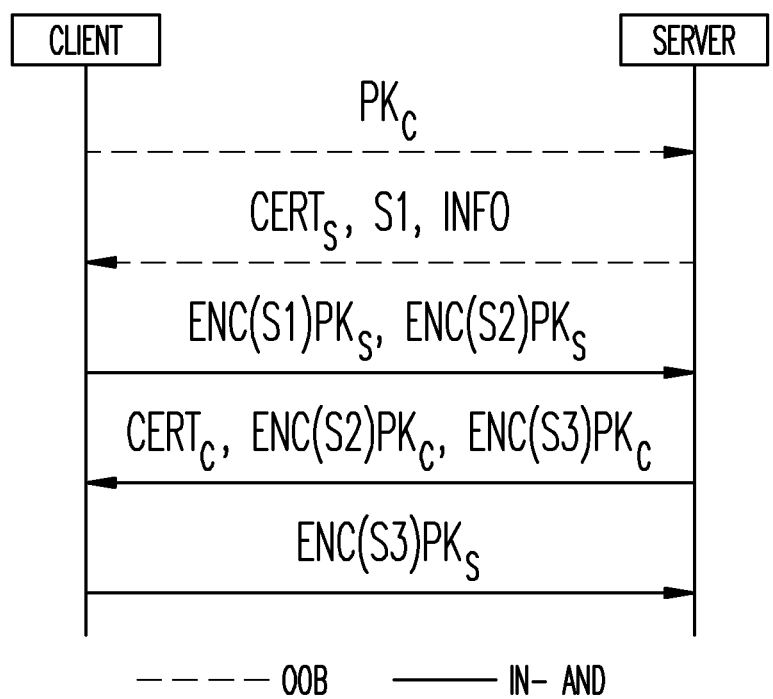
FIG. 10 shows an embodiment of a detailed message exchange between the two devices.

FIG. 10 shows an embodiment of the detailed message exchange between the two devices. The initiator device is shown as client and the responder device is shown as server in FIG. 10. This embodiment operates as follows.

The client sends its public key to the server over the OOB channel.

The server sends its digital certificate to the client over the OOB channel. In addition to sending its digital certificate, the server sends a randomly generated secret (S1), and information required for the client to connect to the server.

The connection information could be IP address and TCP port number in most cases. In the case of WLAN in-band channel, SSID (Service Set Identifier) and WEP (Wired Equivalent Privacy) key may also be included.

The client can now connect to the server over the in-band channel and present the secret (S1) encrypted by the server's public key. In addition, the client sends a randomly generated secret (S2), also encrypted by the server's public key.

If the server can decrypt the secret (S1) with its private key and verify that it is same as the one it sent previously to the client, the identity of the client is established. The server decrypts secret (S2) using its private key and uses it in its next message to the client.

The server can now create a digital certificate for the client and send it to the client on the in-band channel along with secret (S2) encrypted with the Client's Public Key. The server signs the digital certificate. In addition, the server sends another randomly generated secret (S3), also encrypted by the Client's Public Key.

The client decrypts the secret (S2) with its private key and if it is same as the one it sent previously to server, then the client is assured of the identity of the server. The digital certificate for the client can be used for future communications with the server. The client decrypts secret (S3) using its private key and uses it in its next message to the server.

The client encrypts the secret (S3) with the Server's Public Key and sends it to the server. The server decrypts the secret (S3) using its private key. If it is the same as the one it sent previously to the client, then the server is assured of receipt of the client certificate by the intended client.

The server's certificate may be a self-signed certificate or a certificate signed by a certificate authority. The client's certificate may be signed by the server.

Embodiments of the present system and method significantly enhance the value of wireless devices by making it easy to establish trusted groups of devices with secure connections and mutual access control.

Implementing the apparatus, systems, and methods disclosed herein may enhance the security of networks. Embodiments of the present system and method provide improved operation regarding: a framework for out-of-band introduction followed up by in-band credential and application policy establishment phase (configuration of application policies will not be part of our initial standardization effort); the typical user experience for introducing new wireless devices to a network; support for multiple different out-of-band and in-band communication channels; simple role-based access control; and binding domain credentials and policies to specific networks.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, and each claim stands on its own as a separate embodiment.

What is claimed is:

1. A method for establishing mutual trust between a hardware circuit implemented server device and a hardware circuit implemented client device communications session, the method comprising:
    conducting an invitation protocol using an out-of-band (OOB) one-way channel the invitation protocol including sending a message from the server device to the client device, the message including a certificate identifying a sender of the communication, a randomly generated secret, and in-band connection information for the server device to the client device over the OOB channel; and
    conducting an identification protocol to establish the mutual trust between the server device and the client device for the communications session using in-band messages in an in-band two-way channel, wherein conducting the identification protocol includes:
        sending a second message from the client device to the server device, the second message including the randomly generated secret encrypted with a server public key; and
        verifying the client device using the second message, the verifying including the server device decrypting the encrypted randomly generated secret from the second message.

2. The method according to claim 1, wherein the second message further includes a second randomly generated secret encrypted with the server public key and a client public key; and
    wherein conducting the identification protocol further includes:
        responsive to verifying the client device, creating, by the server device, a client certificate for the client with the client public key;
        encrypting, by the server device using the client public key, the second randomly generated secret and a third randomly generated secret;
        sending, by the server device, a third message including the certificate, the client public key encrypted second randomly generated secret and the client public key encrypted third randomly generated secret to the client device;

verifying, by the client device, that the second message reached the server device by decrypting the client public key encrypted second randomly generated secret from the third message;

decrypting, by the client device, the client public key encrypted third randomly generated secret from the third message;

encrypting, by the client device using the server public key, the third randomly generated secret; and sending, by the client device, a fourth message including the server public key encrypted third randomly generated secret to the server device as a guarantee that the third message reached the client device.

3. A non-transitory machine-readable media including instructions, which when executed by a hardware circuit implemented server device, cause the server device to perform operations for establishing mutual trust between the hardware circuit implemented server device and a hardware circuit implemented client device communication session, the operations comprising:

conducting an invitation protocol using an out-of-band (OOB) one-way channel the invitation protocol including sending a message from the server device to the client device, the message including a certificate identifying a sender of the communication, a randomly generated secret, and in-band connection information for the server device to the client device over the OOB channel; and conducting an identification protocol to establish the mutual trust between the server device and the client device for the communications session using in-band messages in an in-band two-way channel, wherein conducting the identification protocol includes:

sending a second message from the client device to the server device, the second message including the randomly generated secret encrypted with a server public key; and verifying the client device using the second message, the verifying including the server device decrypting the encrypted randomly generated secret from the second message.

4. The machine-readable media according to claim 3, wherein the second message further includes a second randomly generated secret encrypted with the server public key and a client public key; and wherein conducting the identification protocol includes:

responsive to verifying the client device, creating, by the server device, a client certificate for the client with the client public key;

encrypting, by the server device using the client public key, the second randomly generated secret and a third randomly generated secret;

sending, by the server device, a third message including the certificate, the client public key encrypted second randomly generated secret and the client public key encrypted third randomly generated secret to the client device;

verifying, by the client device, that the second message reached the server device by decrypting the client public key encrypted second randomly generated secret from the third message;

decrypting, by the client device, the client public key encrypted third randomly generated secret from the third message;

encrypting, by the client device using the server public key, the third randomly generated secret; and sending, by the client device, a fourth message including the server public key encrypted third randomly generated secret to the server device as a guarantee that the third message reached the client device.

5. A server device to perform operations for establishing mutual trust between the server device and a client device communication session, the server device comprising hardware circuits arranged to:

conduct an invitation protocol using an out-of-band (OOB) one-way channel, the invitation protocol including sending a message from the server device to the client device, the message including a certificate identifying a sender of the communication, a randomly generated secret, and in-band connection information for the server device to the client device over the OOB channel; and conduct an identification protocol to establish the mutual trust between the server device and the client device for the communications session using in-band messages in an in-band two-way channel, wherein to conduct the identification protocol includes the server device arranged to:

receive a second message from the client device including the randomly generated secret encrypted with a server public key; and verify the client device by decrypting the encrypted randomly generated secret from a second message.

6. The device of claim 5, wherein the second message further includes a second randomly generated secret encrypted with the server public key and a client public key; and wherein to conduct the identification protocol includes the server device arranged to:

create, responsive to verifying the client device, a client certificate for the client device with the client public key;

encrypt, using the client public key, the second randomly generated secret and a third randomly generated secret; and send a third message including the certificate, the client public key encrypted second randomly generated secret and the client public key encrypted third randomly generated secret to the client device.

* * * * *